United States Patent [19]
Wang et al.

[11] Patent Number: 5,870,540
[45] Date of Patent: Feb. 9, 1999

[54] LOW OVERHEAD METHOD FOR DETECTING COMMUNICATION FAILURES ON A NETWORK

[75] Inventors: Jin Wang, Lisle; Lawrence J. Schroeder, Wheaton; Dennis B. Beasley, Oswego, all of Ill.

[73] Assignee: NCR Corporation, Dayton, Ohio

[21] Appl. No.: 559,865

[22] Filed: Nov. 20, 1995

[51] Int. Cl.$^6$ .................................................. G06F 11/06
[52] U.S. Cl. .................. 395/183.19; 395/183.01; 395/184.01; 395/185.09; 371/20.5
[58] Field of Search .................. 371/20.1, 20.2, 371/20.3, 20.4, 20.5, 20.6; 395/183.19, 180, 181, 182.02, 183.01, 184.01, 185.01, 185.09

[56] References Cited

U.S. PATENT DOCUMENTS

| | | | |
|---|---|---|---|
| 4,868,818 | 9/1989 | Madan et al. | 395/182.02 |
| 5,448,721 | 9/1995 | Kaneko | 371/20.1 |
| 5,461,628 | 10/1995 | Nakamura | 371/20.1 |

Primary Examiner—Robert W. Beausoliel, Jr.
Assistant Examiner—Pierre Eddy Elisca
Attorney, Agent, or Firm—James M. Stover

[57] ABSTRACT

A method for detecting communication failures on a network comprising a server computer connected to multiple client computers, said server and client computers communicating through the transmission of data packets via the network. The method includes the step of periodically sending an echo request message from the server computer to the client computers. Each client computer, following receipt of the echo request message, sends an echo reply message back to the server computer. The method further includes the steps of monitoring the rate at which data packets are received by the server computer; and reducing the frequency at which echo request messages are sent from the server computer to the client computers during periods when the rate at which data packets are received by the server computer exceeds a re-configurable rate value. The frequency at which the echo request messages are sent is dependent upon the rate at which data packets are received by said server computer.

6 Claims, 2 Drawing Sheets

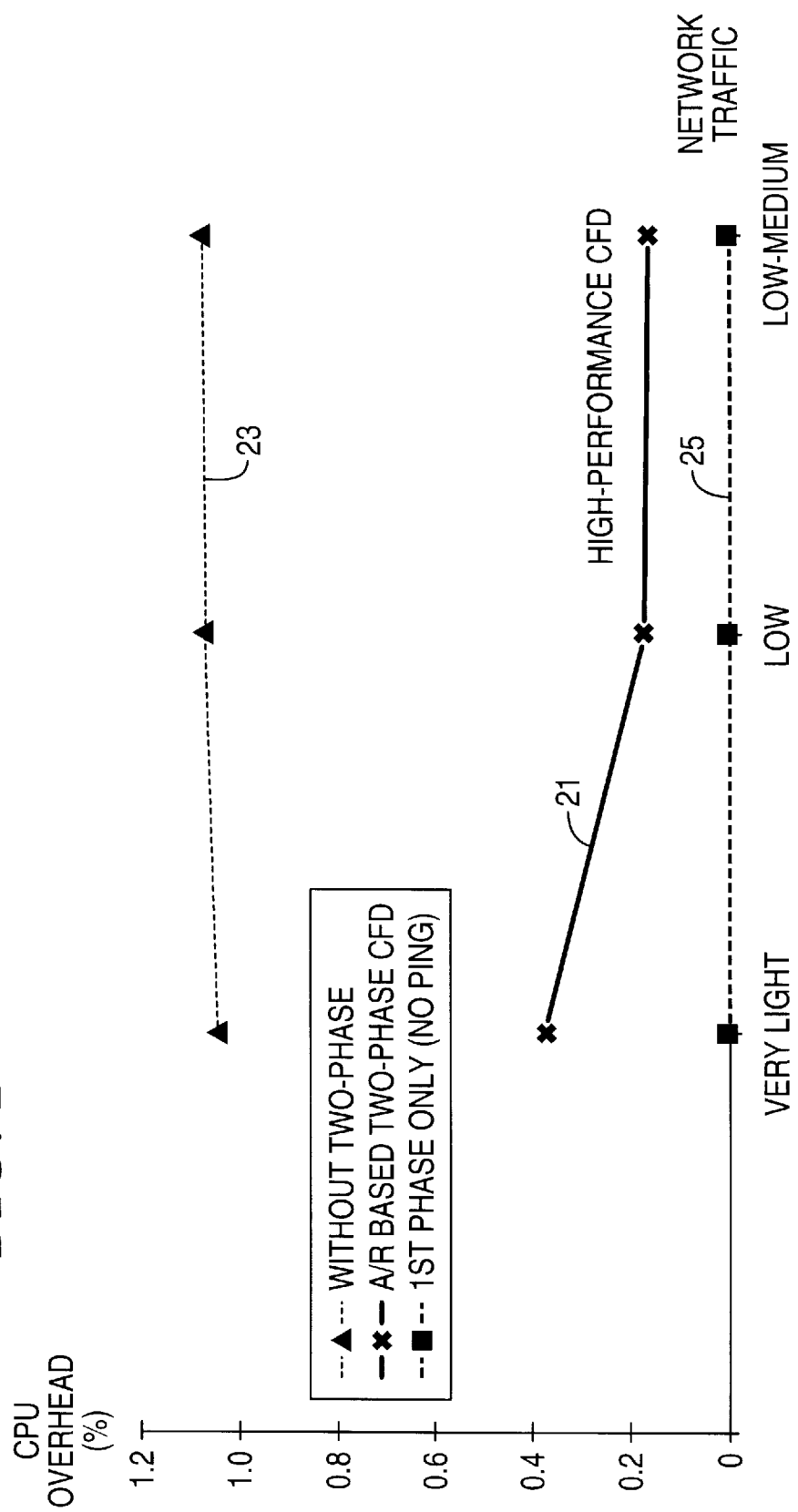

LOW OVERHEAD METHOD FOR DETECTING COMMUNICATION FAILURES ON A NETWORK

The present invention relates to computer networks and, more particularly, to methods for detecting communication failures between network elements.

BACKGROUND OF THE INVENTION

The detection of communication failures within a computer network is necessary to prevent the loss of data, to recover lost data packets, to reorganize the network configuration to maintain functionality, and to correct the failure.

The detection of network communication failures is not particularly difficult by itself from a technical point of view. However, most communication failure detection schemes introduce additional overheads of both CPU consumption and network traffic. Keeping these overheads at a reasonably low level, without sacrificing detection accuracy, could improve product acceptance and customers satisfaction. High performance in terms of low overhead is thus the first goal in the design of a network communication failure detection system.

One known method for detecting network communication failures utilizes test messages which are sent between the server and clients to test the server, clients, network connections, and server and client interfaces. An echo request message packet is generated by the server and dispatched to each client the server "pings" each client. Following receipt of this message from the server, each client is mandated to respond with an echo reply message to the server—the clients "pong" the server. The failure to receive an echo reply message from a client within a predetermined time interval indicates a possible communication failure between the client and the server.

One problem with this approach is the introduced overhead. Consider, for instance, the network shown in FIG. 1. FIG. 1 shows a portion of a computer network including a network server $S_1$, a network bus 11 and several clients, $C_1$ through $C_x$, attached to the network bus. Server $S_1$ includes at least three network interfaces identified by reference numerals $en_1$ through $en_3$. The network is configured such that each server interface is responsible for communication with a different group of clients. If the system includes nine clients and the communication failure detection scheme pings each of these clients every second, then eighteen additional data packets, 9 pings and 9 pongs, would be added to the network traffic every second. The processing of these eighteen data packets would consume the server's CPU time. Moreover, each client would need to process an incoming ping and an outgoing pong every second, slowing down the client's applications. Note that all the additional CPU consumption and network traffic would be present even when the server has a high CPU load, when network traffic is heavy, and when no communication failures are present.

OBJECTS OF THE INVENTION

It is therefore an object of the present invention to provide a new and useful method for the detection of network communication failures.

It is another object of the present invention to provide such a method which provides lower CPU consumption and network usage than existing methods for detecting network communication failures.

It is yet another object of the present invention to provide a high performance, low overhead, method for testing network communication connections which minimizes CPU and network utilization.

It is still a further object of the present invention to provide such a method for testing network communication connections which monitors network traffic and adjusts the use of test packets in response to network traffic volumes.

SUMMARY OF THE INVENTION

There is provided, in accordance with the present invention, a method for detecting communication failures on a network comprising a server computer connected to multiple client computers, said server and client computers communicating through the transmission of data packets via the network. The method includes the step of periodically sending an echo request message from the server computer to the client computers. Each client computer, following receipt of the echo request message, sends an echo reply message back to the server computer. The method further includes the steps of monitoring the rate at which data packets are received by the server computer; and suspending the sending of echo request messages from the server computer to the client computers during periods when the rate at which data packets are received by the server computer exceeds a reconfigurable rate value. Thus network traffic volume is not impacted by the addition of echo request and reply messages during periods of high traffic volume, a period when it is assumed that network communication paths are intact.

In the described embodiment, the sending of echo request messages from the server computer to the client computers is not suspended during periods when the rate at which data packets are received by the server computer exceeds a predetermined rate value, but rather the frequency at which the echo request messages are sent is reduced, the frequency being dependent upon the rate at which data packets are received by said server computer.

The above and other objects, features, and advantages of the present invention will become apparent from the following description and the attached drawings.

BRIEF DESCRIPTION OF THE DRAWINGS

FIG. 2 is a graph which plots CPU overhead against network traffic volume for a network employing the communication failure detection (CFD) system in accordance with the present invention.

DETAILED DESCRIPTION OF THE PREFERRED EMBODIMENT

Figure 1:
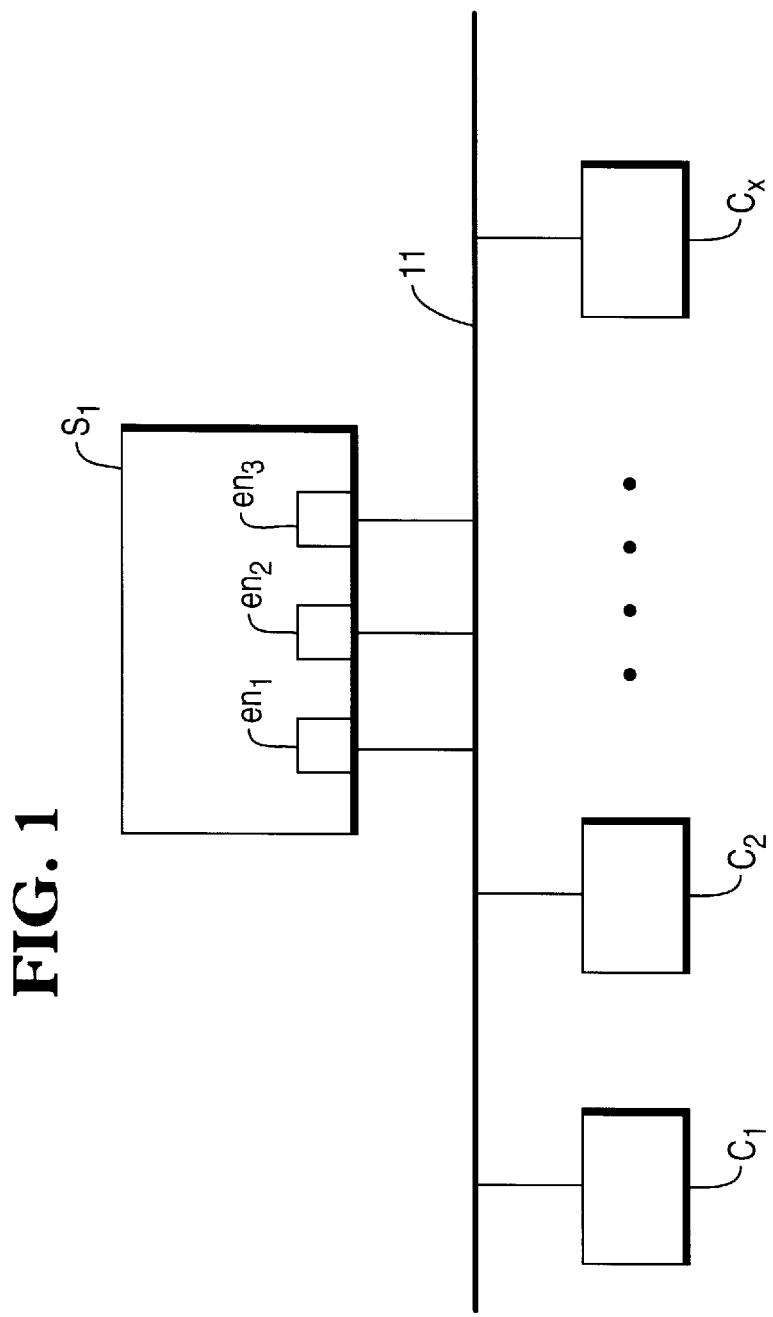
FIG. 1 is a simple block diagram illustration of a computer network including a network server, a network bus and several clients attached to the network bus.

The communication failure detection (CFD) system described herein improves performance over, and reduces the overhead associated with, conventional network communication failure techniques through the use of a two-phase detection scheme, discussed in greater detail below.

Additional performance benefits are provided by a feature included within the CFD system and referred to herein as an anxiety/relaxation model. The anxiety/relaxation model will also be discussed in greater detail below.

Two-Phase Detection Model

The two-phase communication failure detection system of the present invention has a passive observation phase followed by an active probing phase. In the first phase, the CFD system passively observes the incoming data packets received on a given IP interface. When a silence, i.e., lack of network traffic, is observed on a server IP interface, the second phase of the CFD system is invoked. In the second phase, the network server actively probes designated test clients by sending each an echo request message and waiting for the acknowledgments from the test clients. Since client applications usually involve data transfers from time to time, this scheme significantly reduces the need to ping the test clients, keeping both the additional network traffic and CPU overhead required to test communication linkages at a low level.

The CFD system as described above has, however, a potential risk. The scheme fails to detect specific communication failures within the server interface. This situation may occur when all incoming network traffic for a given interface is contributed from non-test clients, while none of the test clients can communicate with the server. Although this scenario is quite unlikely to occur, safeguards should be provided to alleviate this risk. An anxiety/relaxation model, discussed below, is added to the CFD two-phase detection system to reduce such a risk.

Anxiety/Relaxation Model

Operating under the anxiety/relaxation model, the network server monitors network traffic, reducing—but not ceasing—communication failure testing during periods of high network traffic volume. Test messages—echo request messages—are sent less often to clients when it is observed that the clients are engaging in network communications.

Under the anxiety/relaxation model, when network traffic is low, the server will ping the clients, i.e., sending an echo request message to each client, to test the communication links between the clients and server. However, because some communication failures, such as specific communication failures within the server interface discussed above, may not be detected by monitoring network traffic, the server will periodically issue echo request messages even when network activity is high. The following example is provided to assist in understanding the operation of the anxiety/relaxation model.

Consider the following protocol between a mother and her three children who live elsewhere. Each child calls the mother randomly from time to time and the mother expects a certain number of phone calls each day. If she does not receive the expected number of calls by the end of a day, she telephones each child to make sure that her phone works and her children can contact her. If the mother receives the expected number of calls either from her children or from someone else by the end of a day, she does not call her children. However, as days pass she begins to become anxious even through she is receiving the expected number of calls each day. Eventually, her anxiety level raises to a point where she is compelled to phone her children no matter what. If at least one of her phone calls gets through, her anxiety is greatly reduced and she becomes relaxed, no longer feeling compelled to call her children at least for the immediate future. But as days pass, her anxiety again will increase and she will need to make phone calls to her children once again.

The anxiety/relaxation model employed by the CFD system operates in manner similar to the example provided above. When the network server is receiving message packets from the network clients at or above a minimum rate, the test process of pinging clients is suspended. During suspension however, the anxiety of the CFD system builds. Once a threshold anxiety level is reached, the server will ping the network clients to test network communication linkages even while the server is continuing to receive network communications at or above the minimum rate.

The above protocol can be formulated as set forth in the algorithm below, wherein $t_i(n)$ represents the amount of incoming network traffic received from an interface $en_i$ within a time interval $(n-1, n)$, $T_i(n)$ represents a threshold that changes dynamically, and $\Delta T_i$ is a positive constant.

---

Two-Phase Detection with Anxiety/Relaxation

1st Phase (Anxiety Build-Up):

Monitor $en_i$-bounded incoming network traffic, $t_i(n)$,
if $t_i(n) > T_i(n)$, then $T_i(n + 1) \leftarrow T_i(n) + \Delta T_i$,
2nd Phase (Relaxation):

Otherwise, ping each test client associated with $en_i$,
if a pong is received, $T_i(n + 1) \leftarrow T_i(0) - \Delta T_i$
otherwise, $T_i(n + 1) \leftarrow T_i(n) + \Delta T_i$ Note that when an interface is receiving many incoming data packets, the dynamic threshold $T_i(n)$ is increased monotonically, triggering a ping sooner or later.

---

One important property of the above algorithm is that it avoids both generating network traffic (pings and pongs) and consuming CPU resource while bursts of data transfers between clients and a server are occurring on the network. As such, client applications rather than the CFD system have the priority to use both CPU resource and network bandwidth. This feature is evident from FIG. 2, which shows a plot of CPU overhead versus network traffic volume. The center curve 11 is a plot of CPU overhead versus network traffic volume for a network employing the CFD system with anxiety/relaxation based two phase detection. It is seen in curve 21 that CPU overhead decreases as network traffic increases. Without two-phase detection, CPU consumption would slightly increase, possibly due to context switch, when network traffic increases, as shown in the top curve 23. Note that the CPU consumption of the first phase (no ping) is very low as shown by the bottom curve 25. Thus it is the second phase that constitutes the bottle neck of CFD system performance. The use of a two phase detection scheme effectively reduces the cost of the CFD system in detecting communication failures.

The results displayed in FIG. 2 are based on the following test configuration. Three network interfaces, such as $en_1$, $en_2$ and $en_3$, were monitored by the CFD system. Two of the interfaces were in communication with three test clients each, while the remaining interface was in communication with a single test client. For "low" traffic, an average of 5 incoming and 5 outgoing data packets were processed by each interface every 2 to 3 seconds; for "low-medium" traffic, an average of 10 incoming and 10 outgoing packets were processed by each interface. Each data point of the CPU overhead in FIG. 2 was calculated as a percentage of the sum of system time and user time over the total elapsed time which was more than 20 minutes. The internal cycle of the CFD system was 3 seconds.

The number of interfaces being monitored in the above example is typical. Should a shorter cycle, for example, 1 second, be used in the CFD system, or should more interfaces be monitored, the CPU cost of the CFD system would be increased by an estimated factor of 3 to 10. Yet the CFD system could still perform gracefully thanks to the two-phase detection scheme described herein.

It can thus be seen that there has been provided by the present invention a new and useful method for the detection of network communication failures which provides lower CPU consumption and network usage than existing methods for detecting network communication failures. The communication failure detection minimizes CPU and network utilization by monitoring network traffic and adjusting the use of test packets in response to network traffic volumes.

Although the presently preferred embodiment of the invention has been described, it will be understood that various changes may be made within the scope of the appended claims.

What is claimed is:

1. A method for detecting communication failures on a network comprising a server computer connected to multiple client computers, said server and client computers communicating through the transmission of data packets via said network, the method comprising the steps of:

periodically sending an echo request message from said server computer to selected ones of said client computers;

each one of said selected client computers sending an echo reply message to said server computer following receipt of said echo request message by said one of said selected client computers;

monitoring the rate at which data packets are received by said server computer; and suspending the sending of echo request messages from said server computer to said selected client computers during periods when the rate at which data packets are received by said server computer exceeds a reconfigurable rate value.

2. A method for detecting communication failures on a network comprising a server computer connected to multiple client computers, said server and client computers communicating through the transmission of data packets via said network, the method comprising the steps of:

periodically sending an echo request message from said server computer to selected ones of said client computers, said echo messages being sent at a first frequency;

each one of said selected client computers sending an echo reply message to said server computer following receipt of said echo request message by said one of said selected client computers;

monitoring the rate at which data packets are received by said server computer; and reducing the frequency at which said echo request messages are sent from said server computer to said selected client computers to a second frequency during periods when the rate at which data packets are received by said server computer exceeds a predetermined rate value.

3. The method in accordance with claim 2, wherein:

said second frequency is dependent upon the rate at which data packets are received by said server computer.

4. A method for detecting communication failures on a network comprising a server computer connected to multiple client computers, said server and client computers communicating through the transmission of data packets via said network, the method comprising the steps of:

monitoring the rate at which data packets are received by said server computer; and sending an echo request message from said server computer to selected ones of said client computers when the rate at which data packets are received by said server computer is less than a predetermined rate value;

each one of said selected client computers sending an echo reply message to said server computer following receipt of said echo request message by said one of said selected client computers.

5. A method for detecting communication failures on a network comprising a server computer connected to multiple client computers, said server and client computers communicating through the transmission of data packets via said network, the method comprising the steps of:

monitoring the rate at which data packets are received by said server computer; and periodically sending an echo request message from said server computer to selected ones of said client computers when the rate at which data packets are received by said server computer is less than a predetermined rate value, said echo messages being sent at a first frequency; and periodically sending an echo request message from said server computer to selected ones of said client computers when the rate at which data packets are received by said server computer is greater than said predetermined rate value, said echo messages being sent at a second frequency, said second frequency being less than said first frequency;

each one of said selected client computers sending an echo reply message to said server computer following receipt of said echo request message by said one of said selected client computers.

6. The method in accordance with claim 5, wherein:

said second frequency is dependent upon the rate at which data packets are received by said server computer.

* * * * *